United States Patent [19]

Fellows

[11] 3,857,720

[45] Dec. 31, 1974

[54] POLYSILOXANE COATED TRANSFER BASE

[75] Inventor: Charles T. Fellows, Kettering, Ohio

[73] Assignee: NCR Corporation, Dayton, Ohio

[22] Filed: Feb. 8, 1973

[21] Appl. No.: 330,766

[52] U.S. Cl..... 117/36.1, 117/138.8 F, 260/33.6 SB
[51] Int. Cl. ................ B41c 1/06, C08g 37/32
[58] Field of Search ........ 117/36.1, 36.4, 239, 36.7, 117/138.8 F; 252/62, 53; 260/33.6 SB

[56] References Cited
UNITED STATES PATENTS

| | | | |
|---|---|---|---|
| 2,671,734 | 3/1954 | Rosenblum | 117/36.4 |
| 2,822,288 | 2/1958 | Harvey et al. | 117/36.4 |
| 2,984,582 | 5/1961 | Newman et al. | 117/36.4 |
| 3,036,924 | 5/1962 | Newman | 106/14.5 |
| 3,062,676 | 11/1962 | Newman et al. | 117/36.4 |
| 3,087,832 | 4/1963 | Fogle | 117/239 |
| 3,337,361 | 8/1967 | Count | 117/36.1 |
| 3,340,086 | 9/1967 | Groak | 117/36.7 X |
| 3,677,817 | 7/1972 | Muri et al. | 117/36.1 X |
| 3,689,316 | 9/1972 | Fellows et al. | 117/36.1 X |
| 3,792,111 | 2/1974 | Fellows et al. | 260/33.6 SB |

Primary Examiner—Thomas J. Herbert, Jr.
Attorney, Agent, or Firm—E. Frank McKinney; Robert J. Shafer

[57] ABSTRACT

A transfer medium comprising a base having a transferable coating composition thereon. The transferable composition comprises about 3 to 40 percent, by weight, of polysiloxane rubber gum; about 10 to 60 percent, by weight, of a polysiloxane resin; about 1 to 65 percent, by weight, of a sensible material; about ½ to 10 percent, by weight, of a wax; and about 1 to 10 percent, by weight, of a release and adhesion enhancer. The release and adhesion enhancer is in finely-divided, particulate form and the entire composition is coated substantially homogeneously in a single layer.

8 Claims, No Drawings

POLYSILOXANE COATED TRANSFER BASE

BACKGROUND OF THE INVENTION

1. Field of the Invention

This invention relates to transfer media and to a process for making the same. More particularly, this invention relates to transfer media, having transferable coating compositions thereon, which are suitable for applications requiring transfer of the coating composition from the transfer medium to a recording medium. Transfer pressure is applied by means of pressure or by means of pressure and heat such as the impact of type or pressure from other marking instruments in selected areas, either to the back of a transfer medium which has a transferable coating composition thereon or to the back of a recording medium to cause break-away of the coating composition from the transfer medium and adherence of such broken-away coating composition to the recording medium.

Transfer media such as carbon paper and typewriter ribbons have, of course, been known and used for many years. Lately, however, the placing of various types of printed marks on recording media to be handled and sensed by data processing equipment has become a matter of increasing interest and special transfer sheets and printing ribbons have been developed to meet the requirements of such data processing equipment.

One of the greatest problems encountered with marks printed on recording media is the great tendency for the printed marks to smudge. The marks printed on the recording medium usually become smudged when the printed medium is passed through ordinary commercial transactions and when the printed medium is passed through data processing equipment. This problem of smudging is encountered even with some of the most recently developed transfer media. When this smudging occurs, the reliability with which the true mark can be automatically sensed is severely impaired even though the impairment may sometimes be comparatively slight by visual standards.

The present invention provides a transfer medium which is capable of producing suitable printed marks on a recording medium which have sufficient resistance to smudging when the printed medium is passed through ordinary commercial transactions and when the printed medium is processed through data processing equipment so that the printed marks do not sustain any change sufficient to affect the accuracy of the sensing operation.

The present invention provides transfer media, having improved transferable coating compositions, which may be used in the encoding or printing of paper records, such as checks, bank deposit slips, credit charge slips and the like with magnetic symbols which may be used as one-time carbon ribbons or papers. Such printing of magnetic symbols is a common and now very important feature of the business world and of day-to-day life, in general. Application of magnetic encoding using type font recognizable by humans and also readable by magnetic, electronic and optical scanning devices has permitted great flexibility in information processing and has aided in development of devices and systems capable of handling a variety of information sources.

The present invention also provides transfer media, having colored transferable coating compositions thereon, which may be used in the printing of colored code bars on recording media such as paperboard marking tags used by merchandising institutions to identify inventory.

It will be readily apparent that the principles of the present invention can be applied whether the transfer medium is arranged to deposit marks suitable for sensing visually, by optical means, by photoelectric means, by magnetic means, by electroconductive means, or by any other means sensitive to a special material in the coating.

2. Description of the Prior Art

The present invention comprises a transfer medium having a transferable coating composition thereon. The transferable coating composition comprises a polysiloxane rubber gum, a polysiloxane resin, a sensible material, a wax, and a release and adhesion enhancer. The composition of the present invention is cast as a single, substantially homogeneous layer. The transfer medium of the present invention produces encoded or printed marks on a recording medium which possess improved smudge resistant properties.

U.S. Pat. No. 3,087,832 issued Apr. 30, 1963 on the application of M. V. Fogle discloses and claims a layered transfer coating which includes a mixture of a sensible material, a binder, and a substrate release promoter all coated onto a substrate. That mixture coating is then layered over with a wax coating and the wax is used for the purpose of promoting adhesion of the coating to a receiving surface, once tranferred. The coated composition of the Fogle patent includes several of the components used in the present invention. For example, a preferred embodiment of the Fogle patent includes, as a first layer, a magnetic pigment as sensible material, a polysiloxane gum as a binder material, and a polysiloxane resin as a film-embrittling material. There is then a second layer, over the first, which second layer consists of a wax similar to the wax of the present invention and serves a similar purpose—that of promoting adhesion to the receiving surface. The transfer coating of the Fogle patent has been the basis for major magnetic transfer coating products in spite of the fact that the coating therein must be a layered coating, thus increasing the manufacture cost and complexity and in spite of the fact that the coating, once transferred, is succeptible to considerable smudging as a result of normal handling abuse.

U.S. Pat. No. 3,689,316 issued Sept. 5, 1972 on the application of C. T. Fellows, et al., discloses and claims a transfer coating similar to that of the aforementioned Fogle patent. The Fellows, et al., patent, however, includes a special and individual, additional, material which serves a purpose of providing smudge and scratch resistance to the coatings, once transferred. The coating of Fellows, et al., can only be provided in layered form with the wax top coating, thus giving rise to the complex and relatively expensive manufacturing cost and relative lack of durability in the untransferred form.

Additional prior art is found in the following patents disclosing transfer media which produce printed marks on receiving media by means of pressure such as the impact of type or pressure from other marking instruments. U.S. Pat. No. 2,984,582 discloses a tranfer medium having a porous, thermoplastic resin layer containing a transferable ink. The ink is released by the resin layer onto a recording medium without transfer of the resin layer onto the recording medium. U.S. Pat.

Nos. 2,671,734; 2,822,288; 3,337,361 and 3,340,086 disclose transfer media which produce encoded or printed marks on a recording medium. None of these patents disclose the transfer medium having the transfer coating composition of the present invention. U.S. Pat. No. 3,062,676 discloses a transfer medium having a coating composition which is formed of a plurality of coatings. The coatings are transferred to a recording medium thereby producing encoded or printed marks on the medium which possess good smudge resistant properties.

The prior art does not disclose the novel transfer medium of the present invention which produces encoded or printed marks on a receiving medium possessing improved smudge resistant properties.

SUMMARY OF THE INVENTION

In accordance with the present invention, there is provided a transfer medium comprising a base having a transferable coating composition thereon. The transferable coating composition comprises about 3 to 40, preferably about 15 to 25, percent by weight of a polysiloxane rubber gum having a molecular weight ranging from about 200,000 to 1,000,000, preferably about 300,000 to 700,000; about 10 to 60, preferably about 15 to 25, percent by weight of a polysiloxane resin having a molecular weight ranging from about 300 to 100,000; about 1 to 65, preferably about 2 to 20, percent by weight of a sensible material; about ½ to 10, preferably about 1 to 5, percent by weight of a wax; and about 1 to 10, preferably about 2 to 7, percent by weight of a release and adhesion enhancer. The above percents by weight are based on the total, dry, weight of the transferable coating composition.

The wax of the transferable coating of the present invention is incorporated directly into the composition rather than being positioned as an individual layer at the outer surface of the coating. The function of the wax is to aid in adherence of the transferred coating composition to the receiving medium. It is a feature of the present invention that the wax, which promotes adhesion, can be combined directly with the composition and yet not serve to prevent release from the substrate. Such direct combination, while improving performance characteristics of the composition with regard to tranfer, also improves shelf life and stability of the medium with untransferred material in storage. The tendency for the coating material to block in storage is much reduced by removing the surface wax layer. The wax has a melting point of about 140° to 220°F., preferably about 155° to 200°F. and a needle penetration of about 0.5 to 10, preferably about 1 to 9.

One of the most important features of the present invention and that feature which permits casting the transfer composition as a single, homogeneous, coating is the use of a material which provides the unexpected dual characteristic of enhancing release of the composition from the substrate and enhancing adhesion of the composition to the receiving medium. The enhancing material is a finely-divided polyethylene material or copolymer of polyethylene material having particular physical characteristics, hereinafter defined by molecular weights, softening point temperatures and other parameters; and particular particle size requirements within the range of less than 0.1 to more than 5.0 microns in average diameter.

The enhancing material exists in the dried coating as individual particles and is not dissolved by solvents used in preparation of the composition to be coated. The actual function of the enhancing material is not well understood; and, although explanation of the reason for operation of an invention is not necessary for patentability, in an attempt to completely disclose the invention, following are the inventor's beliefs at the present time.

In the manufacture and use of coated transfer media, there has always been a need for some material to promote adhesion between the receiving medium and the coating, once transferred. The art has developed such that waxes are commonly used to provide that adhesion and waxes have always been found to perform that function very satisfactorily. In fact, it was early learned that a wax combined with the remainder of the coating composition promotes adhesion between a fibrous or porous substrate and the composition and, thus, prevents complete transfer of the coating from the fibrous substrate to the receiving medium. Solution to that difficulty was found, in that case, in providing the wax as a thin top coating so that the wax would be available to cooperate with the receiving medium but would be remote from the fibrous substrate and not interfere with release of the coating therefrom. An additional development in the prior art has been the use of a polysiloxane as a material to promote release of the coating from the substrate. Use of the polysiloxane was found to not overcome the adverse effects which result from combining the wax with the remainder of the composition. When both of the adhesion promoter and the release promoter were combined in a single-layer coating composition, each component tended to counteract the desired effect of the other. Until the present invention, adhesion promoters and release promoters have been used effectively together only in coatings of at least two layers. The present invention, with its use of the enhancing material, permits the combination of an adhesion promoter along with a release promoter. When the enhancing material is used, as disclosed in accordance with the present invention, neither of the promoting materials counteracts the effect of the other. The coating composition, using the enhancer, and once cast as a single layer, is easily released by virtue of the release promoter; and, once released, is strongly adhered by virtue of the adhesion promoter. Inventor's present understanding of the function of the enhancer is that, in its particulate form, the enhancer somehow interferes with the film integrity of the coating composition as it exists on the substrate. The composition is somewhat plastic and, when it is transferred, it is believed that the wax is forced onto the receiving medium and into more intimate contact therewith than are the enhancer particles. The wax thereby performs its adhesion promotion. Also, it is noted that the enhancer is not too dissimilar in character from a high melting wax, and it is believed that the force or instantaneous heat involved in composition tranfer may permit the enhancer to partake slightly of the properties of the wax. An additional benefit conferred by the particulate enhancer, as it is homogeneously distributed throughout the coating, is that the particles positioned at the top surface of a coating protrude slightly from the surface and lend a slippery and smudge resistant character to the medium.

In further accordance with the present invention, the tranfer medium of the present invention is produced by a process which comprises applying the above named components of the coating composition, altogether, in a single layer, to a suitable base by means of a volatile organic solvent carrier. The solvented coating composition is spread uniformly over the base and the volatile organic solvent carrier is then allowed to evaporate thereby leaving a transferable coating composition deposited on the base.

DETAILED DESCRIPTION OF THE INVENTION

The polysiloxane rubber gum can have a molecular weight ranging from about 200,000 to 1,000,000, preferably about 300,000 to 700,000. The polysiloxane rubber gum can be substituted with alkyl groups such as methyl or ethyl, or aryl groups such as phenyl or tolyl, or alkenyl groups such as vinyl or propenyl, and the like, or mixtures thereof along the polysiloxane chain.

The polysiloxane resin can have a molecular weight ranging from about 300 to 100,000. The polysiloxane resin can be substituted with alkyl groups such as methyl or ethyl, or aryl groups such as phenyl or tolyl, or alkenyl groups such as vinyl or propenyl, and the like, or mixtures thereof amid the polysiloxane cross-linked structure.

The wax used in the present invention is a wax having a melting point ranging between about 140° to 220°, preferably about 155° to 200°F. as determined by ASTM D-127. Suitable waxes include natural waxes such as carnauba, montan and the like and mixtures thereof; synthetic waxes such as hydrogenated, amide, chlorinated, alkene or olefinic, miscellaneous and the like and mixtures thereof; and petroleum waxes such as microcrystalline, paraffin and the like and mixtures thereof.

The term wax, as used herein, defines a class of waxes which is characterized by a particular degree of hardness as determined by a needle penetration test ASTM D-1321. The needle penetration test measures the depth to which a weighted needle penetrates a sample of wax. In the needle penetration test, a wax sample is melted by heating it to about 30°F. above its melting point and is then solidified by cooling to 77°F. The hardness of the wax is measured with a penetrometer whereby a standard needle, under a load of 100 grams, is applied to the wax sample for 5 seconds. The depth to which the needle penetrates the wax during the 5 second time interval is measured in tenths of a millimeter. If the needle penetrates the wax to a depth of 0.2 millimeter, the hardness rating of the wax is 2. If the needle penetrates the wax to a depth of 0.8 millimeter, the rating of the wax is 8, and so forth. The waxes which can be used according to this invention are those which have a rating from about 0.5 to 10, preferably about 1 to 9. The wax can be an animal, mineral, petroleum, synthetic or vegetable wax or a mixture thereof so long as the wax is stable, can be melted, is emulsifiable or solvent dispersible, has the required degree of hardness and has the above indicated melting point range.

The release and adhesion enhancing material is polyethylene or a copolymer of polyethylene having a softening point ranging between about 180°–270°, preferably about 200°–250° F. as determined by ASTM E-28. Additionally, the enhancing material should exhibit a hardness of about 0.5–90, preferably about 0.5–2.5, as determined as ASTM D-5 and should have molecular weights of about 1,000 to 12,000, preferably about 1,500 to 6,000.

Eligible materials for use as the enhancer include: polyethylene; poly(ethylene-co-vinylacetate); poly(ethylene-co-alkylmethacrylate) where alkyl is, for example, less than five carbon atoms; poly(ethylene-co-alkylacrylate) where alkyl is, for example, less than five carbon atoms; poly(ethylene-co-vinylchloride); poly(ethylene-co-propylene) and copolymers of polyethylene and acrylic acid and the like. Preferred enhancer materials are polyethylene, poly(ethylene-co-vinylacetate), poly(ethylene-co-ethylmethacrylate) and poly(ethylene-co-vinylchloride).

The sensible material used in the present invention can be any material which is capable of being sensed magnetically, by electromagnetic means, by electroconductive means, by visual means, by optical means, by photoelectric means, or by any other means sensitive to the sensible material. The sensible material can be an inorganic or organic material such as a magnetic material, a coloring material, or any other material capable of being sensed and which is compatible with the coating composition.

Suitable sensible materials include: magnetic metal oxides such as iron oxide, cobalt oxide, chromium dioxide and nickel oxide; finely-divided metals and alloys such as bronze, stainless steel, iron, cobalt, nickel and chrome; dyes such as phthalocyanines, rhodamines and xanthenes and crystal violet lactone and malachite green lactone; pigments such as cadmium primrose, chrome yellow, titanium dioxide and zinc oxide; and miscellaneous coloring materials such as carbon black, conductive carbon and charcoal.

The above-named sensible materials constitute only a fraction of the many different sensible materials that can be used in the present invention and are not to be construed as limiting the scope of the suitable sensible materials that can be used in the present invention. Any of the above-named sensible materials can be used alone or in combination with each other or in combination with other suitable sensible materials not specifically named above. The sensible material need only be suitable for the sensing required, have a high resistance to smudging when the coating composition is tranferred onto the recording medium and be compatible with the coating composition.

The base to which the transferable coating composition is applied can be a thin material such as a film, web, sheet, ribbon, fabric or the like. The preferred base is a film of polyethylene terephthalate. However, other bases can be used. For example, cellulosic materials, paper, cellophane, nylon, rubber hydrochloride, polyethylene, polypropylene and the like are acceptable bases when used in the form of a film, web, sheet, ribbon, fabric or the like. The base should have a thickness of about 0.2 to 2, preferably of about 0.3 to 0.8 mil. The base should be such that the transferable coating composition adheres to the base in a proper manner prior to transfer of the coating composition to the recording medium and the tranferable coating composition is released from the base in a proper manner upon transfer. The base should be limited in thickness to permit a full realization of the capability of the transferable coating composition to deposit marks having sharp, clear edge definition on a recording medium. The base should also possess uniform tensile and other physical properties to insure uniform tranfer of the coating composition onto a recording medium.

The transferable coating composition containing the sensible material can be applied to the base in the following manner to produce the transfer medium of the present invention. The wax and the enhancer material are dispersed in about 10 to 25 percent of the volatile organic solvent carrier and that dispersion is heated, with the stirring continued, until the wax and the enhancer are dissolved. The heating source is removed and, again with continued stirring, the system is chilled by rapid addition of the remainder of the solvent carrier. This addition causes precipitation of finely-divided particles of enhancer in the wax solution. To the stirring dispersion of enhancer is added the polysiloxane rubber gum, the polysiloxane resin and the sensible material;—the gum and resin to dissolve and the sensible material to be dispersed. The resulting dispersion is milled, for example, in a ball mill, until the sensible material has been adequately comminuted. An exemplary adequate particle size is about 3 microns and when such a grind is attained the transferable coating composition is completed and ready for coating.

The tranferable coating composition can be applied to the base by roll coating, knife coating or by a similar means. The volatile organic solvent can be evaporated at ambient temperature or can be evaporated by the application of gentle heat thereby leaving a transferable coating composition having a thickness of about 0.1 to 0.4, preferably about 0.15 to 0.3, mil deposited on the base.

Suitable volatile organic solvent carriers for the coating composition include aliphatic and aromatic hydrocarbon solvents such as mineral spirits, naphtha, xylene, toluene and mixtures thereof. Other suitable organic solvents include isopropyl alcohol, isobutyl alcohol, 3 heptanol, isoamyl acetate, ethyl amyl ketone, diisobutyl ketone, carbon tetrachloride, carbon disulfide and mixtures thereof. The polysiloxane rubber gum and the polysiloxane resin should be soluble or at least partially soluble in the volatile organic solvent so that there is a co-mingling of the polysiloxane rubber gum and the polysiloxane resin. One of the above suggested solvents or a mixture thereof can be selected with this criterion in mind.

The above process for producing the transfer medium of the present invention is only illustrative and can be varied within reasonable limits to produce the transfer medium of the present invention.

PREFERRED EMBODIMENTS

The following examples illustrate the present invention and modes of carrying out the invention.

EXAMPLE 1

Magnetic iron oxide tranfer media are prepared in the following manner using the liquid coating compositions described in the following table.

Solvented (Liquid) Coating Compositions
Parts by Weight of-

| Component | Composition With Enhancer | Composition Without Enhancer |
| --- | --- | --- |
| Polysiloxane rubber gum-SE-76[1] | 4.0 | 4.0 |
| Polysiloxane resin- | 7.5 | 7.5 |
| DC-2106[2] | | |
| Polyethylene-AC-8A[3] | 2.0 | — |
| Paraffin wax-5512[4] | 1.0 | 1.0 |
| Black magnetic iron oxide-MO-4232[5] | 14.0 | 14.0 |
| Toluene | 71.5 | 71.5 |
| Total | 100.0 | 98.0 |

[1]Marketed by the General Electric Company, Waterford, N.Y., U.S.A. under the trade designation of SE-76. This is a dimethyl polysiloxane rubber gum which has an average molecular weight of about 340,000 to 390,000 and a William Plasticity No. of 75 to 120 as measured in accordance with ASTM D-926 at room temperature for three minutes.
[2]Marketed by the Dow Corning Corporation, Midland, Michigan, U.S.A. under the trade designation of DC-2106 resin. This resin is a hydroxy curing, methyl phenyl resin having an OH content of about 1 percent and a molecular weight distribution ranging from about 300 to 100,000. This resin has a silicone solids content of 59 percent by weight in toluene and a viscosity of 20 to 50 centipoises at 77°F. This resin is described in Dow Corning Bulletin 07-321 dated June, 1969 and U.S. Pat. 2,718,483.
[3]Marketed by the Allied Chemical Corporation, Morristown, New Jersey, U.S.A. under the trade designation of AC-8A. The material is a homopolymer of ethylene exhibiting a softening point of 240°F. (ASTM E-28), and a hardness of 1.0 (ASTM D-5), and is supplied in a powdered form.
[4]Marketed by the Sun Oil Company, Philadelphia, Pennsylvania, U.S.A. under the trade designation of 5512. The wax is a paraffin having a melting point of 156°F. and a needle penetration of 9 (ASTM D-1321).
[5]Marketed by Charles Pfizer & Co., New York, N.Y., U.S.A. under the trade designation of MO-4232.

The above solvented coating composition without enhancer is prepared by mixing the polysiloxane rubber gum, the polysiloxane resin, the wax and the toluene in a 500 ml. Erlenmeyer flask with constant stirring, thereby forming a composition having a uniform consistency. The sensible material is then added to the composition with constant stirring and the composition is then ball milled, in a 150 ml. stainless steel container containing 40 ml. of ⅛ inch stainless steel balls, until the particle size is about 3 microns. Milling is performed on a paint shaker.

The solvented coating composition with enhancer (the composition of this invention) is prepared by substantially the same manner as described above, with the exception that, before addition of the polysiloxane materials, the wax and the enhancer are heated and stirred into about 10 ml. of toluene to make a solution and then, the solution is chilled by adding the remainder of the toluene without heat. This chilling causes precipitation of finely-divided enhancer particles to yield a dispersion of enhancer in a wax solution. The gum, resin and sensible material are then added in conformance to the procedure previously described.

Each solvented coating composition is then coated onto a 0.35 mil polyethylene terephthalate film and uniformly spread over the film using a wire wound rod to a coverage of about 18 milligrams of solvented coating composition per square inch of film. The toluene is allowed to evaporate at room temperature thereby leaving a dried transferable coating composition having a thickness of about 0.2 to 0.3 mil on the film. The coated film is then cut into printing ribbons.

Printing ribbons of this example with and without the enhancer material are compared with respect to printing characteristics and it is found that the ribbon without enhancer suffers from incomplete tranfer of the composition and distortion and poor edge definition of the material which is transferred, while the ribbon with enhancer exhibits complete transfer and excellent edge definition with substantially no distortion.

EXAMPLE 2

This Example is similar to Example 1 with the exception that the polyethylene enhancer material of that example is replaced herein by poly(ethylene-co-vinylacetate). The poly(ethylene-co-vinylacetate) used herein can be that material marketed by Allied Chemical Corporation under the trade designation of AC-401. That material is a copolymer of ethylene and vinyl acetate exhibiting a softening point of 216° F. (ASTM E-28), a hardness of 4.0 (ASTM D-5) and a vinyl acetate content of about 10 percent, by weight. Comparative results using this composition are the same as those of Example 1, above.

EXAMPLE 3

Materials in this example are identical with materials of Example 1, above, in kind and amount with the exception that the paraffin wax and magnetic iron oxide of that example are replaced herein by microcrystalline wax and carbon black. The carbon black can be that material sold by Columbia Carbon Company, New York, N.Y., U.S.A., under the trade designation of Raven 30. The microcrystalline wax exhibits a melting point of about 185°-190° F. and a needle penetration of 3 (ASTM D-1321). The microcrystalline wax can be that material sold by the Bareco Division of Petrolite Corporation, Tulsa, Okla., U.S.A., under the trade designation of WB-2. This formulation, when prepared, as above-disclosed, with the enhancer material, exhibits complete transfer and excellent edge definition with substantially no distortion. Of course, it is understood that the material quantities, disclosed in this example, to be only certain weights, can be any amounts within the ranges of amounts, as previously above-disclosed.

EXAMPLE 4

The same kinds and amounts of materials are used in this example as are used in Example 1, above, with the exceptions that a magnetic cobalt power is used as the sensible material (such as the product sold by Charles Pfizer and Co., Inc., New York, N.Y.) and a poly(ethylene-co-acrylic acid) is used as the enhancer material. The copolymer of ethylene and acrylic acid can be that sold by Allied Chemical Corporation under the trade designation of AC-540 and exhibiting a softening point of 226°F. (ASTM E-28), a hardness of 2.0 (ASTM D-5) and an acrylic acid content of about 40 percent, by weight. Again, the comparative results indicate that the composition using enhancer is superior to the composition without enhancer.

What is claimed is:

1. A transfer medium comprising a base having a transferable coating composition in a single layer thereon; said coating composition comprising a substantially homogeneous mixture of about 3 to 40 percent by weight of a polysiloxane rubber gum having a molecular weight ranging from about 200,000 to 1,000,000; about 10 to 60 percent by weight of a polysiloxane resin having a molecular weight ranging from about 300 to 100,000; about 1 to 65 percent by weight of a sensible material; about ½ to 10 percent by weight of a wax; and about 1 to 10 percent by weight of a release and adhesion enhancing material selected from the group consisting of polyethylene and copolymers of polyethylene having molecular weight of about 1,000 to 12,000, softening point of about 180 to 270° Fahrenheit, and being present as a particulate, finely-divided solid 0.1 to 5.0 microns in average diameter.

2. The transfer medium of claim 1 wherein the polysiloxane rubber gum has a molecular weight ranging from about 300,000 to 700,000 and is present in the coating composition in an amount of about 15 to 25 percent by weight.

3. The transfer medium of claim 1 wherein the polysiloxane resin is present in the coating composition in an amount of about 15 to 25 percent by weight.

4. The transfer medium of claim 1 wherein the copolymers of polyethylene are poly(ethylene-co-vinylacetate); poly(ethylene-co-vinylchloride); poly(ethylene-co-propylene); poly(ethylene-co-acrylate); poly(ethylene-co-alkylacrylate) wherein alkyl is less than five carbon atoms; or poly(ethylene-co-alkylmethacrylate) wherein alkyl is less than five carbon atoms.

5. The transfer medium of claim 1 wherein said sensible material comprises a magnetic metal or oxide thereof.

6. The transfer medium of claim 1 wherein the sensitive material is present in the coating composition in an amount of about 2 to 20 percent by weight.

7. The transfer medium of claim 1 wherein said base is a thin polymeric material.

8. The transfer medium of claim 7 wherein said base is a film of polyethylene terephthalate.

* * * * *